United States Patent [19]
Fujimoto et al.

[11] Patent Number: 5,014,271
[45] Date of Patent: May 7, 1991

[54] PULSE INSERTION CIRCUIT

[75] Inventors: Naonobu Fujimoto, Yokohama; Yukio Suda, Tochiga; Katsutoshi Miyaji, Utsunomiya, all of Japan

[73] Assignee: Fujitsu Limited, Kawasaki, Japan

[21] Appl. No.: 323,944

[22] Filed: Mar. 15, 1989

[30] Foreign Application Priority Data

Mar. 25, 1988 [JP] Japan ............................... 63-069336

[51] Int. Cl.$^5$ ............................................. H04J 3/06
[52] U.S. Cl. .................... 370/102; 370/100.1; 370/105.3; 375/118
[58] Field of Search ............ 370/102, 100.1, 105, 370/105.1, 105.3, 105.4, 105.5, 106, 108; 375/118, 112, 111, 114, 116

[56] References Cited
U.S. PATENT DOCUMENTS

| 4,580,279 | 4/1986 | Kahn | 370/102 |
|---|---|---|---|
| 4,730,346 | 3/1988 | Jiang | 370/105 |
| 4,748,623 | 5/1988 | Fujimoto | 370/105 |
| 4,755,971 | 7/1988 | Jasmer | 370/102 |
| 4,791,652 | 12/1988 | McEachern et al. | 370/102 |
| 4,811,367 | 3/1989 | Tajika | 370/105 |

FOREIGN PATENT DOCUMENTS 0097247 6/1982 Japan ................................. 370/102

Primary Examiner—Benedict V. Safourek
Assistant Examiner—Alpus H. Hsu
Attorney, Agent, or Firm—Staas & Halsey

[57] ABSTRACT

A pulse insertion circuit alternately distributes serial input data at a predetermined data clocking rate into first and second parallel input data, which are synchronously and simultaneously written into and read from a memory, the second input data as read being delayed by one bit. A selection means selects between the second input data and the one-bit delayed second input data and further switches between and establishes either a direct or a cross connection between the selected one of the second input data, as read or as delayed, and the first input data and the first and second output terminals thereof, at which there are produced, correspondingly, parallel and selected, first and second input data. A control means responds to a pulse insertion request to inhibit memory read-out by one read clock period and to control the switching means selectively to switch between the direct and cross-connections, the pulse addition being made to one of the parallel and selected, first and second input data, as specified by the pulse insertion request. Pulse insertion thus is performed at one-half the predetermined clocking rate, the selected and parallel, first and second input data with the required pulse inserted in the specified one thereof, thereafter being multiplexed and transmitted at the predetermined clocking rate.

8 Claims, 11 Drawing Sheets

Fig. 1

| F1 | F2 | F3 | F4 | D1 | D2 | D3 | D4 | D5 | D6 | D7 | D8 |
| H1 | H2 | H3 | H4 | D9 | D10 | D11 | D12 | D13 | D14 | D15 | D16 |
| H5 | H6 | H7 | H8 | V1 | V2 | V3 | V4 | D17 | D18 | D19 | D20 |

| F 1 | D 1 | D 5  |
|-----|-----|------|
| H 1 | D 9 | D 13 |
| H 5 | V 1 | D 17 |

| OPERATION MODE | PRIOR STATE | INSERTION REQUEST | OUTPUT | | CURRENT STATE |
|---|---|---|---|---|---|
| I | NO DELAY | CA (Da1) | NO CLOCK INHIBITION | CROSS | DELAY |
| II | NO DELAY | CB (Da2) | NO CLOCK INHIBITION | CROSS | DELAY |
| III | DELAY | CA (Da1) | CLOCK INHIBITION | STRAIGHT | NO DELAY |
| IV | DELAY | CB (Da2) | CLOCK INHIBITION | STRAIGHT | NO DELAY |

PULSE INSERTION CIRCUIT

BACKGROUND OF THE INVENTION

1. Field of the Invention

The present invention relates to a pulse insertion circuit for inserting pulses used as a frame synchronizing signal, a housekeeping bit or the like, in data multiplexing equipment used in a digital communication system.

2. Description of the Related Art

In digital multiplexing equipment used in a data transmission system, a frame synchronizing signal, a parity bit or the like must be inserted in the data, and a pulse insertion circuit is provided for this purpose. The pulse insertion circuit must operate in response to the data transmission speed, and therefore, when high speed transmission data is processed, the cost of the circuit is high. Accordingly, there is a demand for an economical circuit construction for inserting pulses even when processing high speed transmission data.

In the data transmission system, data of a plurality of channels is often transmitted after multiplexing, and upon reception, is demultiplexed to produce the respective channel data. For example, a transmission system wherein data transmitted at a 45 Mb/s speed is multiplexed by 36 channels and converted to a light signal of 1.6 Gb/s has been proposed.

Essential signals for the digital multiplexing equipment are a frame synchronizing signal, stuff information, housekeeping information as telemetry information, and a variable slot signal for stuffing, or the like. When a multiplexing signal using these signals is formed, because the scale of the circuit operating at a high speed must be reduced, a pulse insertion circuit corresponding to each channel is provided, the frame synchronizing signal and the housekeeping information are inserted in the respective channel data, the stuff bit is inserted to the variable slot, and the multiplexed data in the multiplexing circuit is supplied. Therefore, the pulse insertion circuit is constructed to adapt to an operating speed corresponding to the channel data transmission speed, and the multiplexing circuit is constructed so as to adapt to an operating speed corresponding to the multiplexed data transmission speed.

The pulse insertion circuit in each channel is constituted by a logic IC (integrated circuit) adapted to the data transmission speed. For example, in the case of a transmission speed of less than 40 Mb/s (Mega bit/second), a C-MOS (complementary metal-oxide semiconductor) circuit can be utilized; in the case of a transmission speed of less than 50 Mb/s, a TTL (transistor transistor logic) circuit can be utilized; and in the case of a transmission speed of less than 400 Mb/s, an ECL (emitter-coupled logic) circuit can be utilized.

As mentioned above, in the case of a channel transmission speed of less than 45 Mb/s, since the C-MOS circuit cannot be used, the TTL circuit is used. The electric power consumption of the TTL circuit, however, is about ten times that of the C-MOS circuit, and this constitutes an enormous drawback. In the case of a higher transmission speed, the ECL circuit is utilized, but the power consumption of the ECL circuit is greater than that of the TTL circuit, and therefore, the application of large scale integration techniques becomes difficult. If the ECL circuit is used, a drawback occurs in that a pulse insertion circuit for transmitting data at a speed of more than 400 Mb/s cannot be realized.

SUMMARY OF THE INVENTION

An object of the present invention is to provide a pulse insertion circuit wherein, even at a high speed transmission of input data, a pulse insertion necessary for multiplexing can be carried out by using a circuit adapted to operate at one half of the speed of the input data, and wherein circuit elements having reduced heat generation and integrated at a high density are utilized.

In the present invention, there is provided a pulse insertion circuit comprising a series to parallel conversion means for alternately distributing and thereby converting series input data to parallel data comprising first input data and second input data; a parallel type elastic memory, for receiving the first input data and the second input data and which can be written and read synchronously; a delay means for receiving the second input data read, as read from the elastic memory, and outputting that received, second input data delayed by one bit; a selection means for receiving the first input data and the second input data read, as read from the elastic memory by a read clock signal, and the delayed data, for selecting one of the second input data and the delayed data, and for further selecting either a cross connection or a direct connection of the prior selected one of the second input data and the delayed data thereof or the first input data; a control means for stopping application of the read clock signal to the elastic memory for one period, upon receipt of a request for a pulse insertion; and a pulse addition means for adding a pulse when the delayed, second input data as output by the delay means is selected by the selection means and the clock is stopped for one period in response to the pulse insertion request.

According to this invention, the series input data is converted in parallel and becomes parallel data which is transmitted at a speed which is half of the speed of the series input data. The parallel data is written into the parallel type elastic memory simultaneously by a write clock signal, and the written data is simultaneously by the read clock signal. The read parallel, first and second input data read from the memory is applied to the selection means directly and the second input data further is applied thereto through the delay means.

The selection means can select one of the second parallel input data and the delayed second input data (i.e., as delayed by one bit through the delay means), and can directly (or "straight") connect or can cross-connect the thus selected non-delayed or delayed second input data and the first input data. For example, the second input data, delayed through the delay means, may be selected and the delayed data, so selected, thereupon is transferred and utilized as the first input data. Then one bit of the delayed, second input data of the parallel data, just prior to the cross connection, is output a second time as one bit of the first input data, and therefore, the double output bit can be handled as one bit jump.

The selection means returns to the state or condition preceding the above cross-connected condition, and simultaneously, the read clock signal is eliminated by one pulse. Then, in the other data of the parallel data, as is in the above-mentioned case, one bit of the one (i.e., first) input data is output again as one bit of the other (i.e., second) input data, and therefore, this bit also can be handled as a one bit jump. Namely, by transferring the selection means to the prior selection state, an arbitrary one of the parallel data input data bits can be selected and replaced with an inserted pulse, and simultaneously, the order of the original series input data can be maintained for subsequent conversion to series data.

Further, since in the parallel data processing, the operation speed of the processing circuit is only half of the speed of the series input data transmission, the pulse insertion for high speed data transmission can be carried out economically.

Other features and advantages of the invention will be apparent from the following description given with reference to the accompanying drawings.

DESCRIPTION OF THE PREFERRED EMBODIMENTS

Prior to the description of the preferred embodiments, the related arts are explained with reference to FIGS. 1 to 5.

Figure 1:
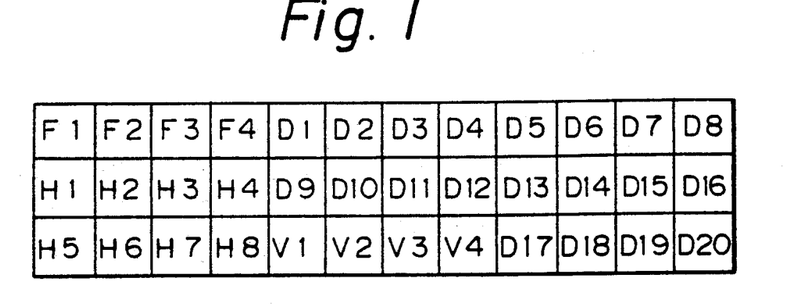
FIG. 1 is an explanatory diagram of stuff synchronizing type multiplexing conversion frames.

FIG. 1 is an explanatory diagram of frames in an exemplary stuff type multiplexing equipment, which is most widely used in multiplexing equipment, wherein data for four channels is multiplexed. In FIG. 1, F1 to F4 denote frame synchronizing signals, H1 to H8 denote housekeeping information such as stuff or telemetry information, V1 to V4 denote variable slots for stuffing, and D1 to D20 denote data.

Figure 2:
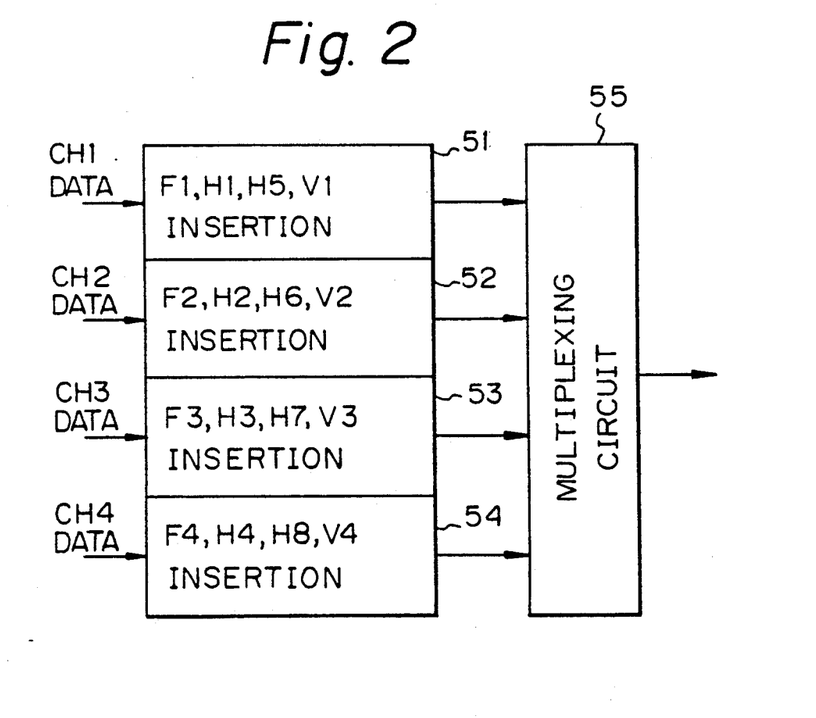
FIG. 2 is a block diagram of a multiplexing conversion equipment.

When the multiplexing signal using these frame structures is formed, to reduce the scale of the circuit for a high speed operation, the construction shown in FIG. 2 has been used. Namely, pulse insertion circuits 51 to 54 are provided corresponding to the channels CH1 to CH4, and the frame synchronizing signal F1 to F4, the housekeeping information H1 to H8, the stuff bit for the variable slots V1 to V4, or the like are inserted in the data of each of the channels CH1 to CH4, respectively, and then the parallel and thus-inserted, channel data for the respective, plural channels CH1 to CH4 are multiplexed at a multiplexer 55 and transmitted. Accordingly, the pulse insertion circuits 51 to 54 utilize circuits adapted to the data transmission speed of each individual channel, and only the multiplexing circuit 55, which multiplexes the plural parallel channel data of the respective plural channels, is adapted to operate at a high speed.

Figure 3:
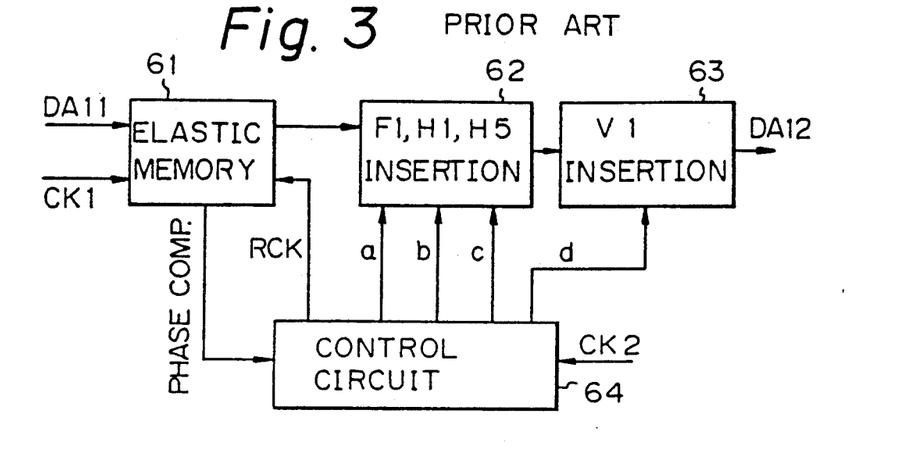
FIG. 3 is an outline block diagram of a conventional pulse insertion circuit.

The pulse insertion circuit 51 corresponding to the channel 1 has, for example, the construction shown in FIG. 3, wherein 61 denotes an elastic memory, which is a buffer memory such as a first-in-first-out memory, 62 and 63 denote pulse insertion portions, and 64 denotes a control circuit. The data DA11 and the clock signal CK1 are supplied to the elastic memory 61 and the data DA11 is written in the elastic memory 61 in synchronization with the writing clock signal CK1.

The data DA11 stored in the elastic memory 61 is read by a read clock signal RCK from the control circuit 64 and supplied to the pulse insertion portions 62 and 63. Also, to prevent an under-flow in the elastic memory 61, phase comparison information (PHASE COMP.) obtained by a comparison of a write address and a read address is supplied to the control circuit 64, and before the under-flow occurs, the output of the read clock signal RCK from the control circuit 64 is stopped. Then, a stuff bit is inserted into the variable slot, the clock signal CK2 from the multiplexing circuit 55 (see, FIG. 2) is supplied to the control circuit 64, the read clock signal RCK is output in synchronization with the clock signal CK2, and request signals a to d for the pulse insertion portions 62 and 63 are also output.

Thus, into the data DA11 read from the elastic memory 61, the frame synchronizing signal F1, the housekeeping information H1 and H5, and the stuff bit in the variable slot V1 are inserted, and data DA12 synchronized with the clock signal CK2 is supplied to the multiplexing circuit 55.

Figure 4:
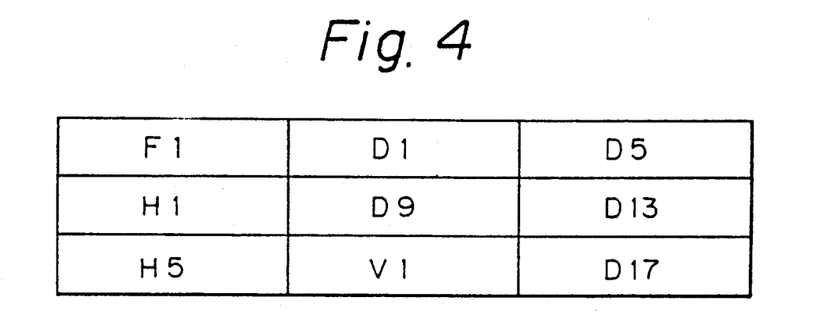
FIG. 4 is an explanatory diagram of a frame constitution in the channel 1 in the equipment of FIG. 2.

FIG. 4 shows a frame structure for the channel 1. The frame synchronizing signal F1, the housekeeping information H1 and H5, and the stuff bit for the variable slot V1 are inserted in the data DA11 (D1, D5, D9, D13, D17, ...) of the channel 1.

Figure 5:
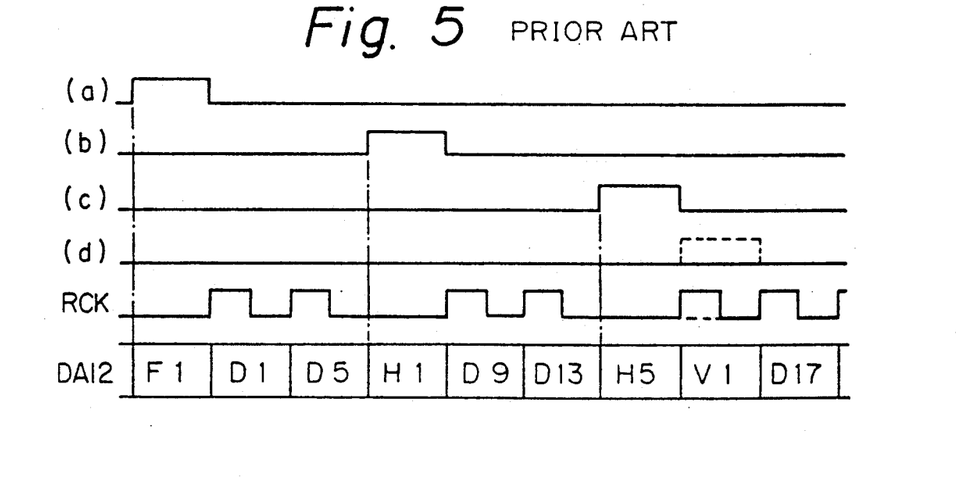
FIG. 5 is an explanatory diagram of an operation of the circuit shown in FIG. 3.

FIG. 5 is an explanatory diagram of an operation of the circuit of FIG. 3. In FIG. 5, waveforms of request signals a to d output from the control circuit 64 are shown in first to fourth ranks, respectively, and the read clock signal RCK from the control circuit 64 is shown in a fifth rank as a waveform. The sixth rank shows the framed, composite output DA12 signal. Namely, when the request signal a (1st rank) is applied to the pulse insertion portion 62, the frame synchronizing signal F1 is inserted, as shown in the fifth rank, the read clock signal RCK is eliminated by. When the read clock signal RCK becomes "0", reading of the data DA11 from the elastic memory 61 is stopped, and at each output pulse of the read clock signal RCK, i.e., RCK becomes "1", the data DA11 is read.

Accordingly, after the frame synchronizing signal F1 is inserted, the read clock signal RCK is output, the data D1 and D5 are read, the read clock signal RCK is eliminated for a half pulse interval, and then the request signal b (2nd rank) becomes "1", and the housekeeping information H1 is inserted after the data D5. Then the read clock signal RCK is again output and the data D9 and D13 is read. Further, the read clock signal RCK is eliminated for a half pulse interval, the request signal c becomes "1", as shown in the third rank, and the housekeeping information H5 is inserted after the data D13.

When the phase comparison information supplied to the control circuit 64 indicates a reduction of the quantity of the data DA11 stored temporarily in the elastic memory 61, the control circuit 64 eliminates the read clock signal RCK for one clock period by adding one bit, as shown by the dotted line. During that period, the request signal d shown by the dotted line in the fourth rank is supplied to the pulse insertion portion 63, and a stuff bit is inserted to the variable slot V1.

As mentioned above, data DA12 which comprises desired pulses inserted in the data DA11, is supplied to the multiplexing circuit 55, which then multiplexes the respective, parallel and thus-inserted data of a plurality of channels (e.g., four (4) channels as shown in FIG. 2).

The circuit according to the present invention aims to execute the pulse insertion using lower speed circuitry.

Figure 6:
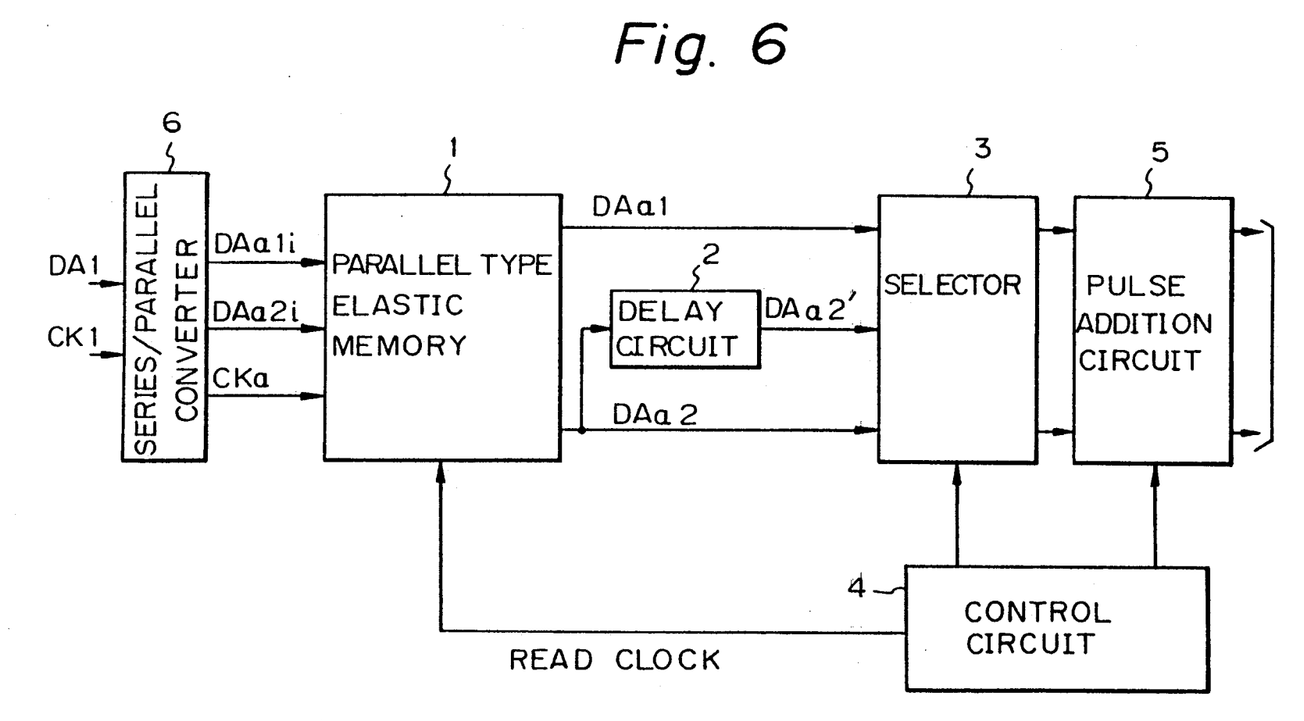
FIG. 6 is a block diagram giving a summary of the present invention.

A pulse insertion circuit according to the present invention is now explained, with reference to FIG. 6.

The object of the present invention is to provide a low power consumption and low cost circuit by reducing the speed needed to operate this lower speed circuitry by a further one half.

The pulse insertion circuit of the invention converts series data to parallel data, to reduce the operating speed, and can insert one bit pulse at any desired position.

The pulse insertion circuit comprises a series to parallel converter 6 for converting series input data DA1 to parallel input data DAa1i and DAa2i; a parallel type elastic memory 1 in which the parallel input data, comprising first input data DAa1i and second input data DAa2i, is written in synchronization with a writing clock signal CKa and from which the parallel input data is read and output as DAa1 and DAa2 in synchronization with a read clock signal (READ CLOCK); a delay circuit 2 for delaying the second input data DAa2, as read from the elastic memory 1, by one bit and outputting same as DAa2; a selector 3 for selecting one of the second input data DAa2 as read from memory 1 and the output DAa2 of the delay circuit 2, and for selecting, further, either the selected one of the second input data DAa2 and the delayed data DAa2, or the first input data DAa1 as read from memory 1; a control circuit 4 for stopping the READ CLOCK signal for one pulse period, which otherwise is supplied to the parallel type elastic memory 1, upon receipt of a pulse insertion request for inserting a frame synchronizing signal, etc., and for controlling the selector 3 to form a one bit space in the output data thereof; and a pulse addition circuit 5 for inserting a pulse into the one bit space in the output from the selector 3 in accordance with the pulse insertion request. The channel data series into which the pulse is inserted at the pulse addition circuit 5, thereafter is multiplexed with the other channel data series.

Embodiments of the present invention are now explained in detail with reference to FIGS. 7 to 15.

Figure 7:
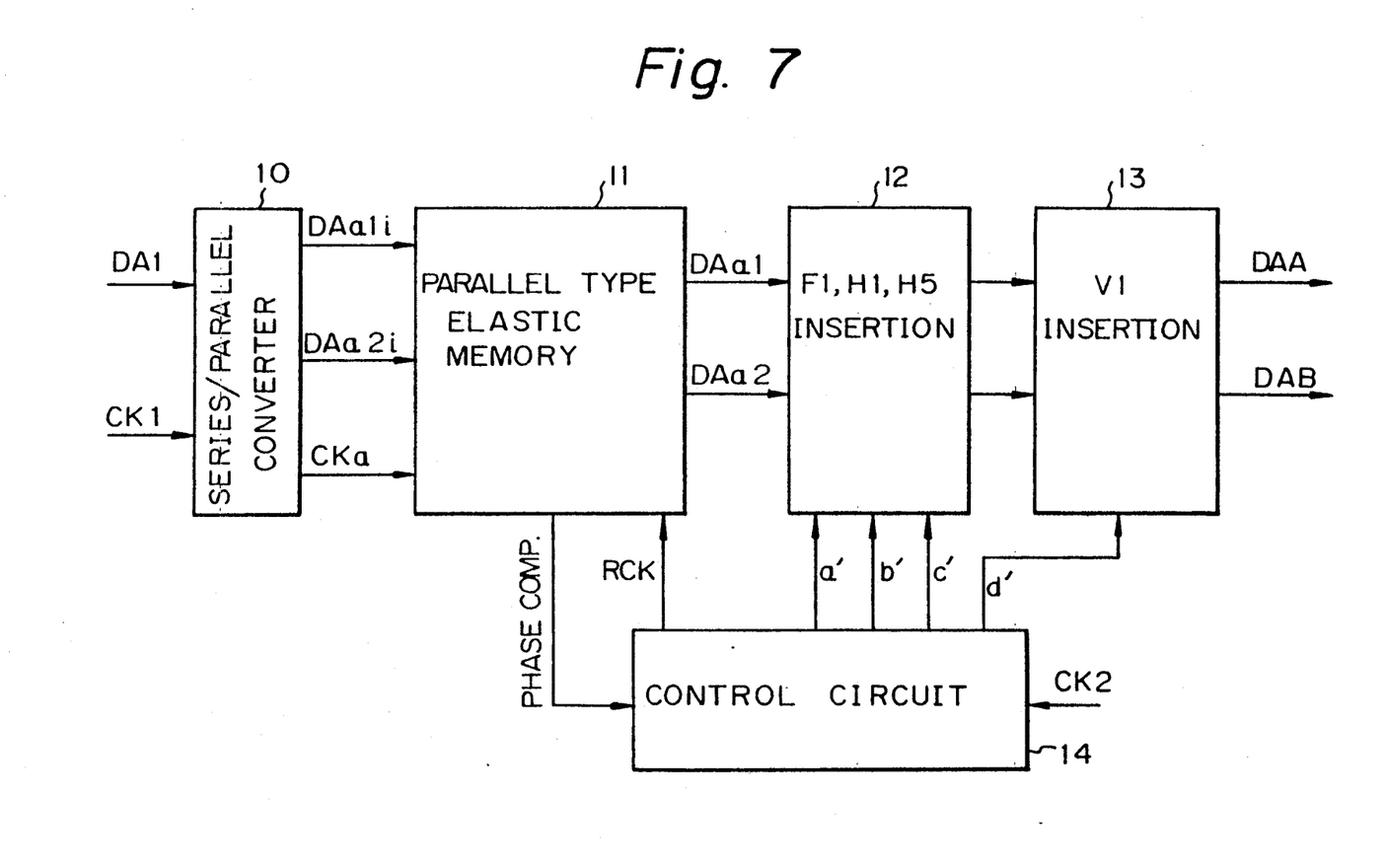
FIG. 7 is a block diagram of an embodiment according to the present invention.

FIG. 7 shows a block diagram of an embodiment of the present invention, wherein a pulse insertion circuit corresponding to each channel is shown corresponding to the example given in FIG. 3. In FIG. 7, 10 denotes a series to parallel converter, 11 denotes a parallel type elastic memory comprising a buffer memory such as a first-in-first-out memory and which can store two parallel data at the same time, 12 and 13 denote pulse insertion portions, and 14 denotes a control circuit. A series input data DA1 is supplied to the series to parallel converter 10 with a clock signal CK1 and converted to parallel data DAa1i and DAa2i, and the clock signal CK1 is converted to a clock signal CKa having a frequency which is half of the frequency of the series input data, and which is supplied to the parallel type elastic memory 11.

Phase comparison information (PHASE COMP.) for preventing an under-flow of the parallel type elastic memory 11 is supplied to the control circuit 14, and a clock signal CK2 from the multiplexing circuit (not shown) is supplied to the control circuit 14. Parallel data DAa1 and DAa2 are read from the parallel type elastic memory 11 upon receipt of a read clock signal RCK from the control circuit 14, and supplied to the pulse insertion portions 12 and 13.

The pulse insertion portions 12 and 13 include the delay circuit 2, selector 3, and pulse addition circuit 5 as in FIG. 6. In the portions 12 and 13, a frame signal F1, housekeeping information H1 and H5, or a stuff bit for a variable slot V1 are inserted into either of the parallel data DAa1 and DAa2 in response to request signals a' to d' from the control circuit 14, and then the thus inserted parallel data DAA and DAB are supplied to the multiplexing circuit (not shown) and multiplexed with parallel data of the other channels as in the conventional system of FIG. 2.

Figure 8:
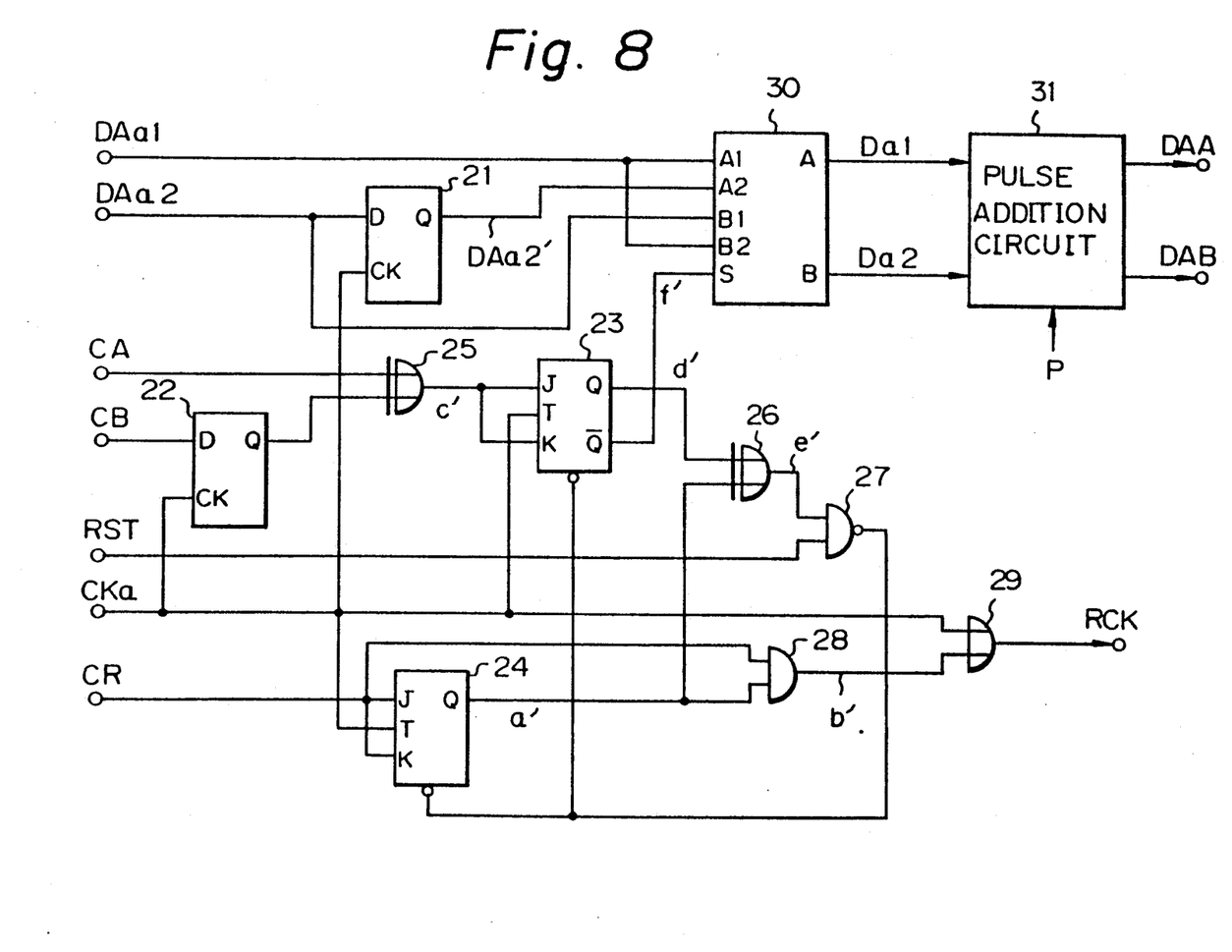
FIG. 8 is a partial circuit diagram of the embodiment shown in FIG. 7.

FIG. 8 is a block diagram showing main parts of the embodiment of the invention. This figure shows the main parts of the delay circuit 2, the selector 3, and the pulse addition circuit 5. In FIG. 8, 21 and 22 denote D type flip-flops, 23 and 24 denote J-K flip-flops, 25 and 26 denote exclusive OR circuits, 27 denotes a NAND circuit, 28 denotes an AND circuit, 29 denotes an OR circuit, 30 denotes a selector, and 31 denotes a pulse addition circuit.

DAa1 and DAa2 denote parallel data converted from the series input data, CA and CB denote control signals for inserting pulses into the parallel data Da1 and Da2, CA is an insertion request signal for the upper data Da1 and CB is an insertion request signal for the lower data Da2, RST denotes a control signal for a reset, CKa denotes a clock signal synchronized with the parallel data, CR denotes a control signal for eliminating one pulse of the read clock signal RCK, i.e., CR is obtained by the logical sum of CA and CB, Da1 and Da2 denote corresponding parallel data from the selector 30, and DAA and DAB denote parallel data in which a pulse P is inserted; then, the parallel data DAA and DAB are supplied to the multiplexing circuit (not shown).

The flip-flop 21, having a data terminal D which is supplied with the data DAa2 and a clock terminal CK which is supplied with the clock signal CKa, corresponds to the delay circuit 2 in FIG. 6. This delay circuit 2 delays the data DAa2 by one bit and outputs the delayed data DAa2'. As the delay circuit a, a J-K flip-flop or an appropriate delay line can be utilized instead of the D type flip-flop. The selector 30 is supplied with the data DAa1 at terminals A1 and B2 thereof, the delayed data DAa2; delayed by one bit, is supplied to a terminal A2 thereof, and the data DAa2 is supplied a terminal B1 thereof. A terminal S of the selector 30 is supplied with an output signal f' from an output terminal $\overline{Q}$ of the flip-flop 23. When the signal f' is applied to the terminal S and depending on its state ("1" or "0"), the connections between the terminals A1 and A2, and B1 and B2 are transferred, or switched, between the output terminals A and B, respectively. Namely, when the signal f' is "1", the terminal A1 is connected to, the terminal A and the terminal B1 is connected to the terminal B termed herein, a "straight connection". When the signal f' is "0", the terminal A2 is connected to the terminal A and the terminal B2 is connected to the terminal B termed herein, a "cross connection".

The flip-flop 22 is supplied with the control signal CB at a data terminal D thereof and the clock signal CKa at a clock terminal CK thereof and thus the control signal CB is delayed by one bit. An output signal of a Q terminal of the flip-flop 22 and the control signal CA are supplied to the exclusive OR circuit 25, the output signal c' of the exclusive OR circuit 25 is supplied to J and K terminals of the flip-flop 23, and the clock signal CKa is supplied to a T terminal thereof, and thus the flip-flop 23 carries out an inversion operation. The output signal f', from the $\overline{Q}$ terminal output of the flip-flop 23, is supplied to the S terminal of the selector 30, and an output signal d', from the Q terminal of the flip-flop 23, is supplied to the exclusive OR circuit 26 with an output signal a', from the Q terminal output of the flip-flop 24. The flip-flops 23 and 24 are reset by the control signal RST through the NAND circuit 27 at the initial time of a power ON, etc., and when the operation reaches an asynchronous state.

The flip-flop 24 is supplied with the control signal CR at the J and K terminals thereof and supplied with the clock signal CKa at the T terminal thereof and thus a signal a' synchronized with the clock signal CKa is output at a Q terminal of the flip-flop 24. The signal a' and the control signal CR are supplied to the AND circuit 28, and an output signal b' of the AND circuit 28 and the clock signal CKa are supplied to the OR circuit 29. The output signal of the OR circuit 29 is the read clock signal RCK, and accordingly, if the control signal CR having one bit width becomes "1", the output signal b' from the AND circuit 28 becomes "1" and has a pulse width of one bit, and the OR circuit 29 outputs the read clock signal RCK which becomes "1" during the period of one and a half pulses. Therefore, since the read clock signal RCK from which one pulse has been eliminated is supplied to the parallel type elastic memory 11 (see FIG. 7), and the data DAa1 and DAa2 are identical, as output from the elastic memory 11.

Figure 9:
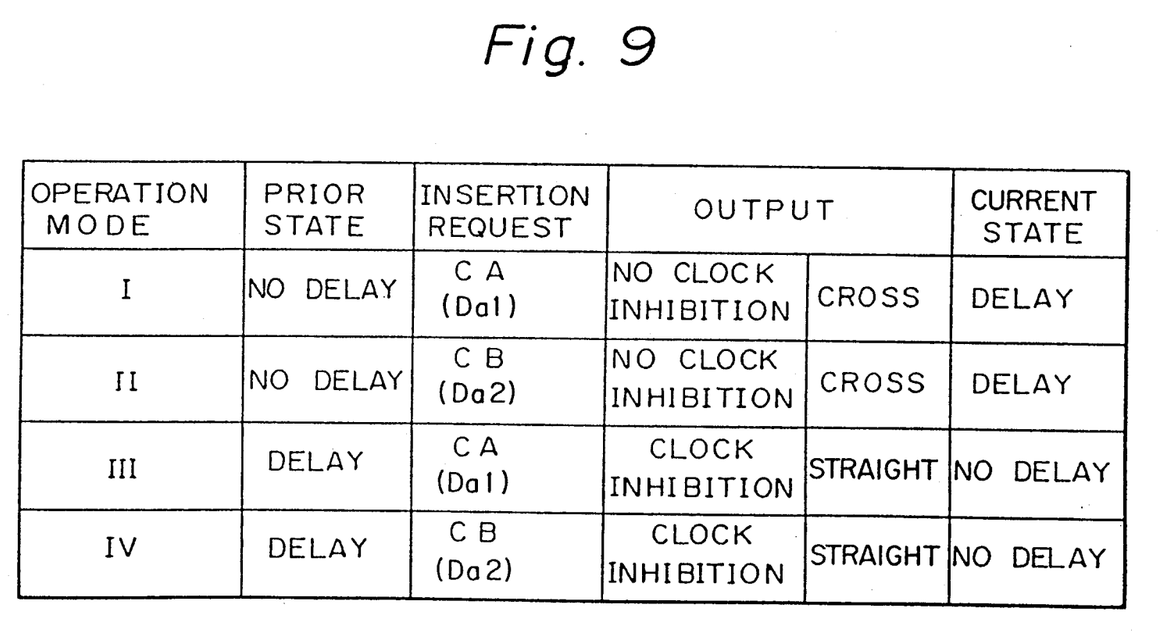
FIG. 9 is an explanatory diagram showing operation modes of the embodiment shown in FIG. 7.

FIG. 9 is an explanatory diagram showing operation modes of the selector 30. In the figure, a delay or no delay in the initial, or prior, state (i.e., the state preceding the mode about to be established). DAa1 or DAa2 in the insertion request, namely, either of the parallel, data DAa1 of DAa2 output by the series to parallel converter 10 (FIG. 7), clock inhibition or clock noninhibition in the output data, a cross connection ("CROSS") or a straight connection ("STRAIGHT") to form the output data, and delay or no delay in the current state (i.e., the state produced in accordance with the mode), are designated in correspondence to operation modes I, II, III and IV. For example, in the operation mode I, since no delay in the prior state exists, the pulse insertion request is inserted into the data Da1, the read clock is not inhibited, i.e., the clock pulse elimination is not executed, and the cross connection between the data DAa1 and DAa2 is carried out in the, selector 30, whereby, although in the prior initial state, the Q terminal output (DAa2') of the flip-flop 21 is not selected, i.e., no delay, in the next or current state, the Q terminal output of the flip-flop 21 and this delay is selected as the current state of the mode.

In the operation mode II, the pulse insertion request is supplied to the data Da2, and the control of the selector 30 is the same as that in the operation mode I.

In the operation mode III, the delayed data is used in the prior (initial) state, the pulse insertion request CA is applied to the data Da1, the read clock is inhibited by one clock period, and the selector returns to the initial state, i.e., the straight state. Accordingly, in the next state, the delayed output DAa2' is not used.

In the operation mode IV, the pulse insertion request CB is applied to the data Da2, and the control of the selector 30 is the same as that in the operation mode III.

FIG. 10 to 13 are explanatory diagrams showing the operations of the embodiment according to the invention. All references used in each of FIGS. 10 to 13, correspond to the references used in FIG. 8, and the symbols attached to the waveforms in each correspond to the symbols attached to the signals in FIG. 8.

Figure 10:
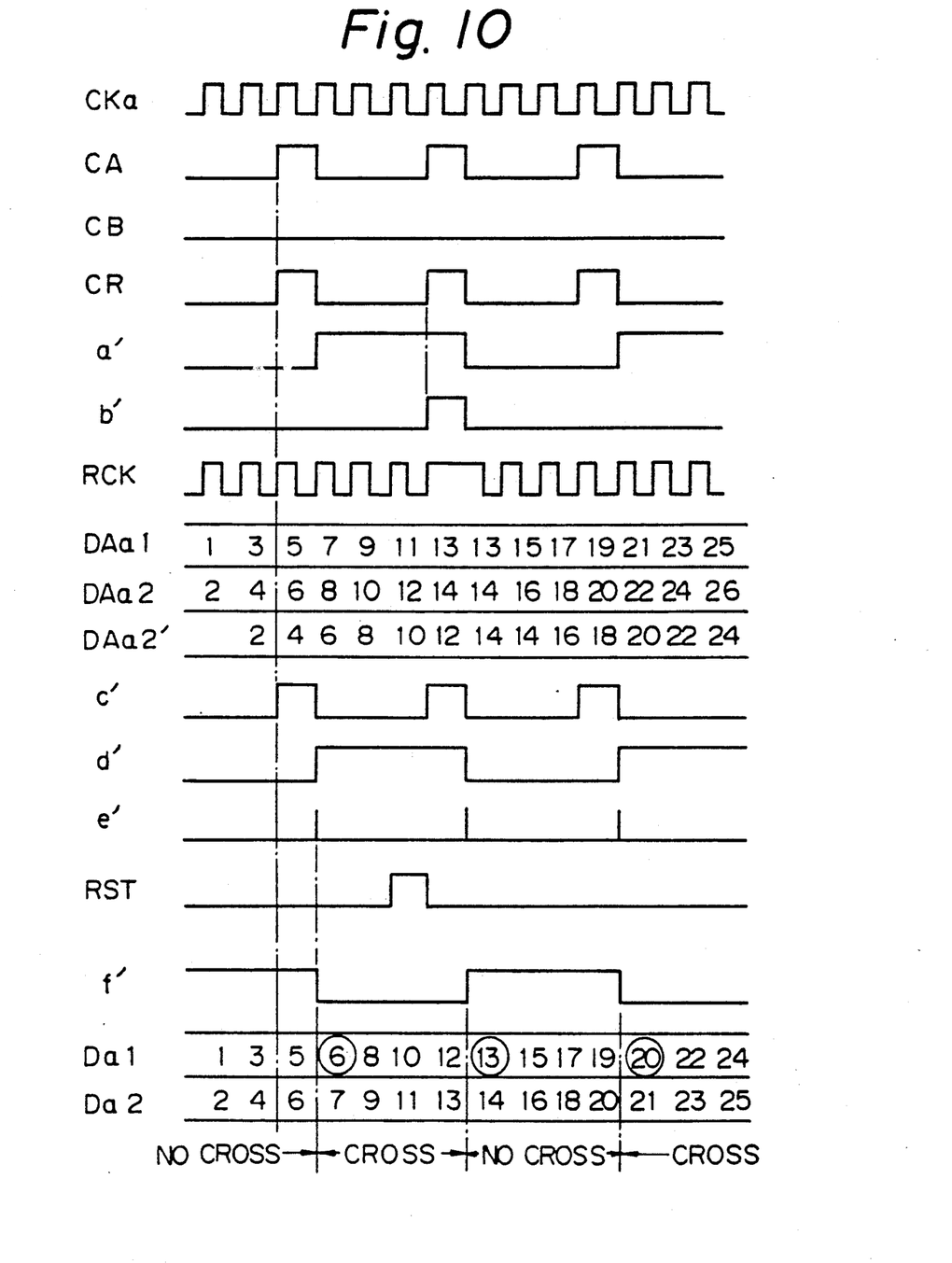
FIG. 10, FIG. 11, FIG. 12, and FIG. 13 are explanatory diagrams showing operations of the embodiment shown in FIG. 7 and FIG. 8.

In FIG. 10, the pulse is inserted in the upper data of the parallel data, i.e., the Da1 side, and the control signal CB is held at the "0" level. The control signal CA becomes "1", as shown in FIG. 10, upon receipt of the pulse insertion request, and the control signal CR becomes "1" in synchronization with the control signals CA and CB, and the flip-flop 24 is inverted at the trailing edge of the control signal CR. The output signal a' from the Q terminal of the flip-flop 24 is shown as the waveform a' in FIG. 10, and therefore, the output signal b' from the AND circuit 28, shown as a waveform b', becomes, "1"when the CR becomes "1" and the waveform a' is also "1". The pulse width of the signal b' is the pulse width of one period of the clock signal CKa, and thus the read clock signal RCK output from the OR circuit 29 becomes "1" during the time of one and a half pulses of the clock signal CKa, and the read clock signal RCK comes into effect after one pulse elimination.

The data DAa1 and DAa2 comprise series to parallel converted, two parallel data: note, the data DAa1 is called upper data and the data DAa2 is called lower data. In the figure, the series data numbered by sequential numerals has been converted to parallel data series: and odd numbers belong to the data DAa1 and even numbers belong to the data DAa2. When the read clock signal RCK is eliminated by one pulse, identical data follows as shown by the example of numbers "13" and "14". The data DAa2' is delayed by one bit from the data DAa2.

Further, since the control signal CB is "0" level, the output signal c' from the exclusive OR circuit 25 is equal to the control signal CA, the output signal d' from the Q terminal of the flip-flop 23 becomes "1", and the $\overline{Q}$ terminal output signal f' becomes "0". In this case, the operation mode is I and the selector 30 connects A2 with A and B2 with B, i.e., the cross connection. Accordingly, the data Da1 from the terminal A is a series of 1, 3, 5, 6, 8, . . . , and the data Da2 from the terminal B is a series of 2, 4, 6, 7, 9, . . . . In this case, 6 in the lower data Da2 is output again from the selector 30 in the upper data Da1, and therefore, the pulse can be inserted at the position shown by the encircled 6 in the upper data Da1 in the figure.

Further, the output signal a' from the Q terminal of the flip-flop 24 is made "0", by the control signal CR which is synchronized with the second control signal CA, and the output signal b' from the AND circuit 28 is made "1" by the control signal CR at that time. Therefore, as mentioned above, one pulse of the read clock signal RCK is eliminated, the data DAa1 and DAa2 are again, and thus for a second time, the same value, the flip-flop 23 is inverted, and the output signal f' from $\overline{Q}$ terminal is changed from "0" level to "1" level. In this case, the operation mode is III, the selector 30 connects A1 with A and B1 with B, and the selector 30 returns to the initial state. As a result, since number 13 appears twice, i.e., in Da2 and again in Da1, and thus the pulse can be inserted in the position shown by the encircled 13 in the data Da1.

When the control signal CR becomes "1", in synchronization with the third control signal CA, the selector 30 is switched to the cross state, and the pulse can be inserted at the position shown by the encircled 20 in the data Da1.

Figure 11:
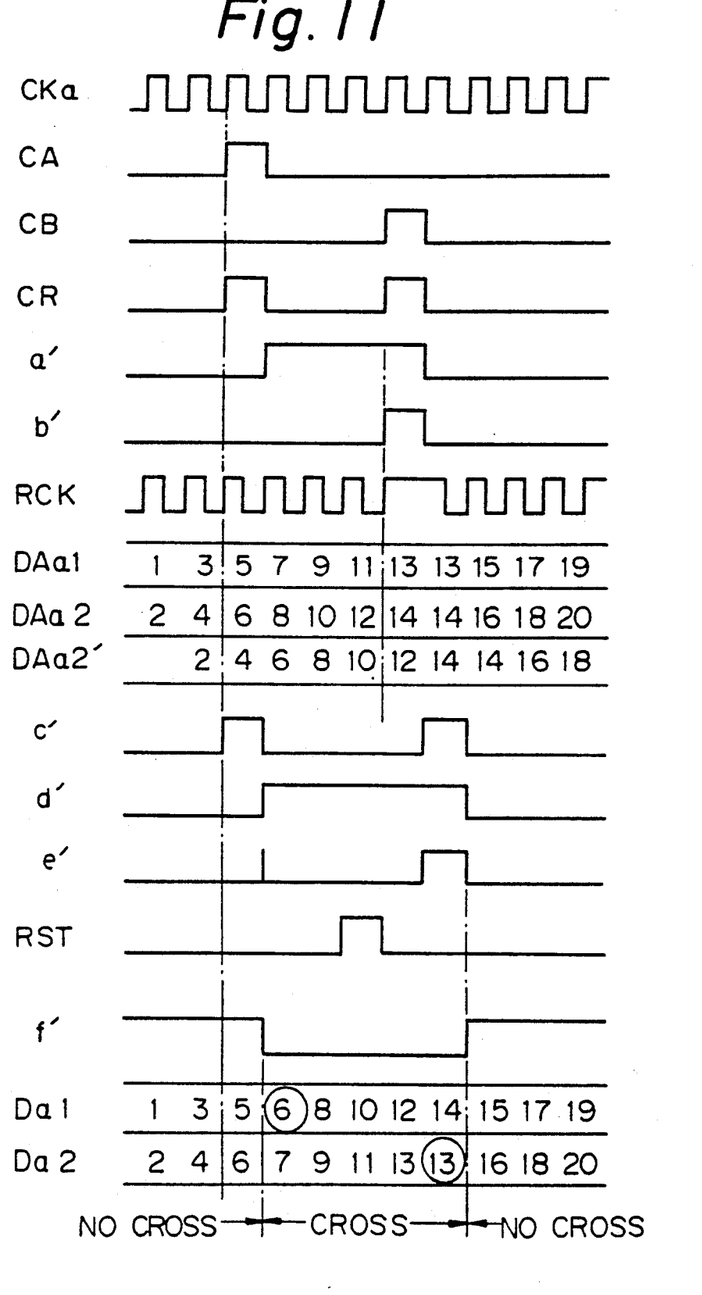

In FIG. 11, the pulse is inserted in the upper data Da1 and then in the lower data Da2. First, when the control signal CA becomes "1", the selector 30 switches from the straight to the cross state and thus produces mode I, as in the case when the first control signal CA in FIG. 10 becomes "1", and the pulse can be inserted in the position shown by the encircled 6 in the data Da1.

Further, when the control signal CB becomes "1", the control signal CB is delayed by one bit through the flip-flop 22 and supplied to the exclusive OR circuit 25. The output signal c' is shown by the waveform c' in FIG. 11. The output signal c' causes the output signal f' from the $\overline{Q}$ terminal of the flip-flop 23 to change from "0" to "1", as shown in the waveform f' in FIG. 11. In this case, the operation mode is IV, and the selector 30 connects A1 to A and B1 to B, i.e., is in the initial state. At that time, the data denoted by the encircled 13 in the data series Da2 is output twice, and thus the pulse can be inserted at the position shown by the encircled 13.

Figure 12:
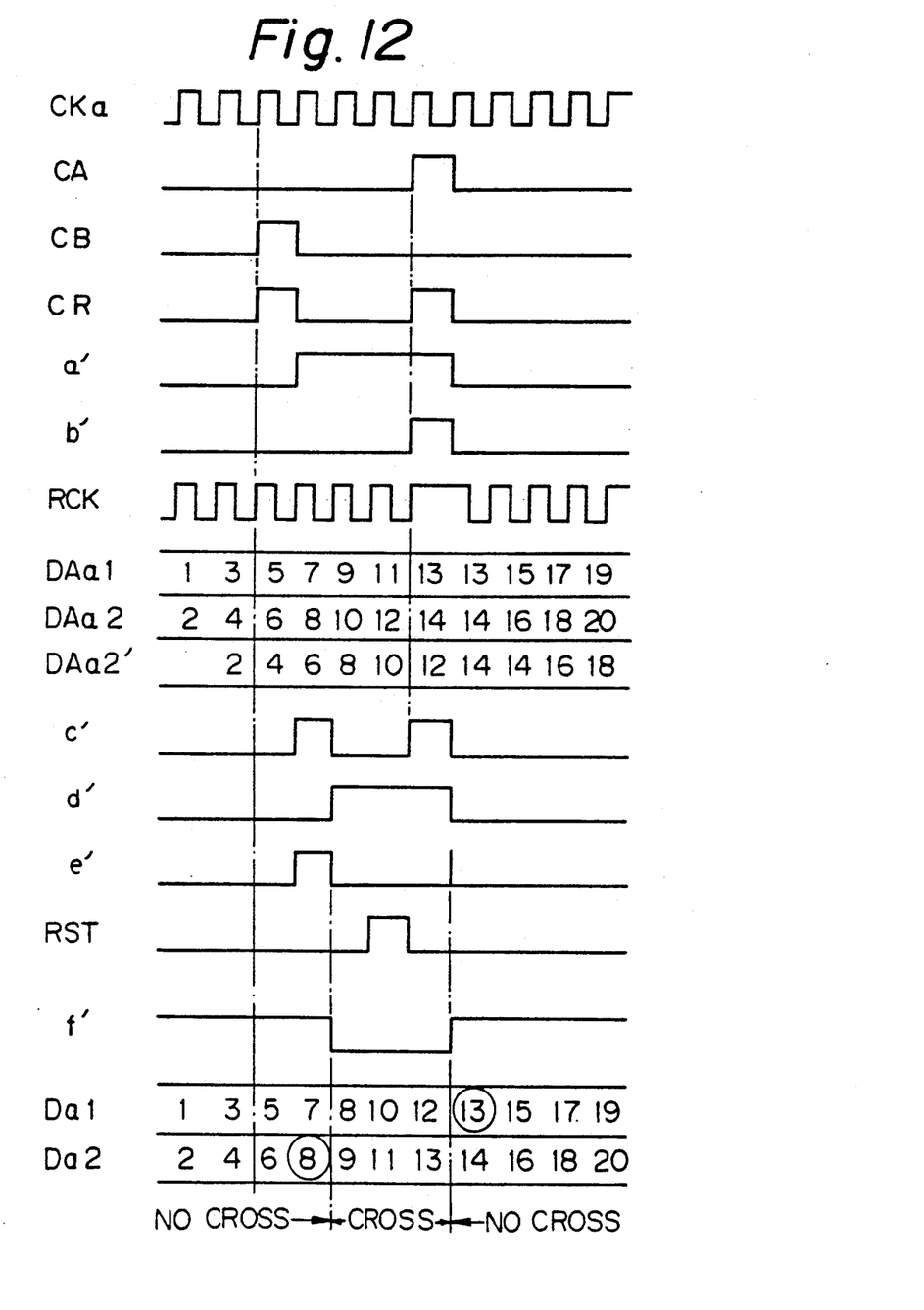

In FIG. 12, the pulse is inserted in the lower data Da2, and then in the upper data Da1. First, when the control signal CB becomes "1", the control signal CB is delayed by one bit through the flip-flop 22 and the delayed signal is supplied to the exclusive OR circuit 25. The output signal c' from the exclusive OR circuit 25 inverts the output of the flip-flop 23, and the output signal f' from the $\overline{Q}$ terminal of the flip-flop 23 places the selector 30 in the cross state or connection. The operation mode is II, and at that time, the data shown by numeral 8 in the lower data Da2 is output again in the upper data Da1, and thus the pulse can be inserted in the position shown by the encircled 8 in FIG. 12.

Subsequently, when the control signal CA becomes "1", the flip-flop 23 is inverted, the output signal f' from the $\overline{Q}$ terminal thereof is changed from "0" to "1", as shown by the waveform f' in FIG. 12, and the selector 30 returns to the initial state, i.e., the straight connection. At that time, the data numbered 13 in the lower data series Da2 is again output in the upper data series Da1, and thus the pulse can be inserted at the position shown by the encircled 13.

Figure 13:
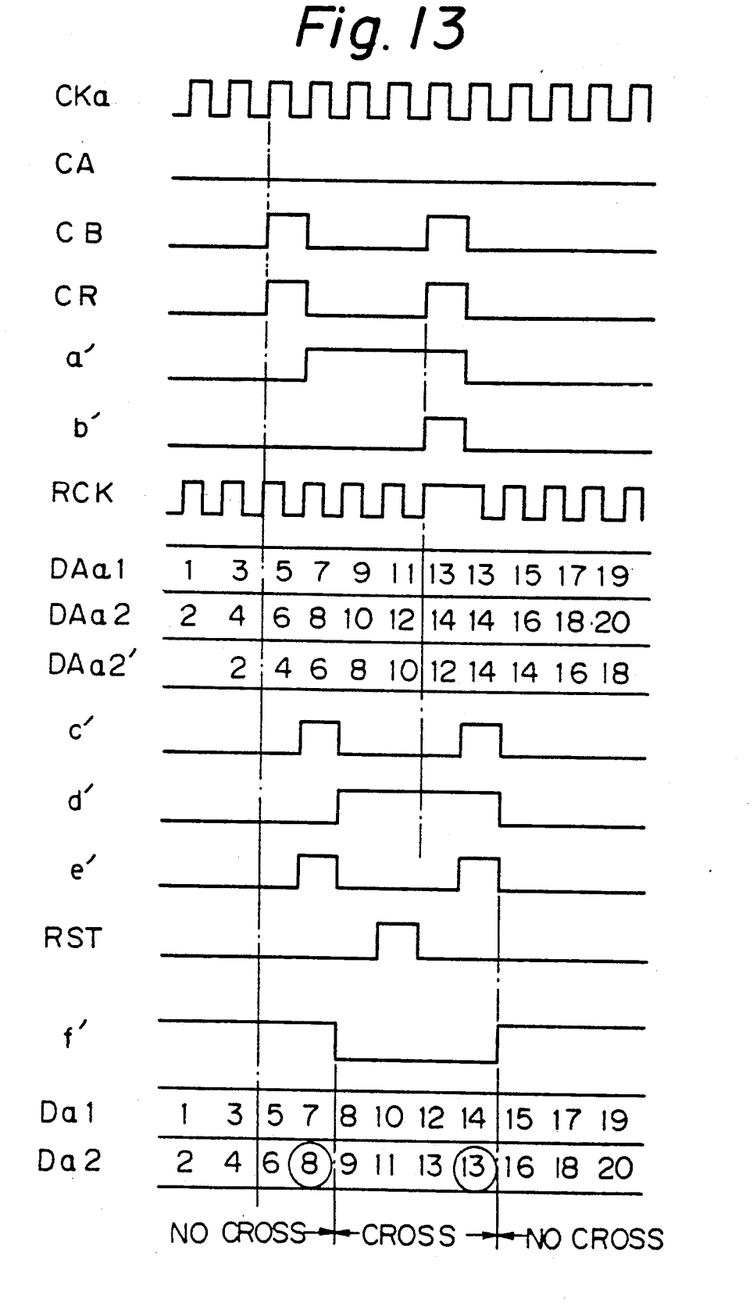

In FIG. 13, the pulse is inserted in the lower data series Da2. First, when the control signal CB becomes "1", the selector 30 switches to the cross state or connection, as when the first control signal CB becomes "1" in FIG. 12, and the pulse can be inserted at the position shown by the encircled 8 in FIG. 13.

Subsequently, when the control signal CB again becomes "1", the selector 30 is in the straight connection, or state, as when the control signal CB becomes "1" in FIG. 11, and the pulse can be inserted at the position shown by the encircled 13 in FIG. 13.

Figure 14:
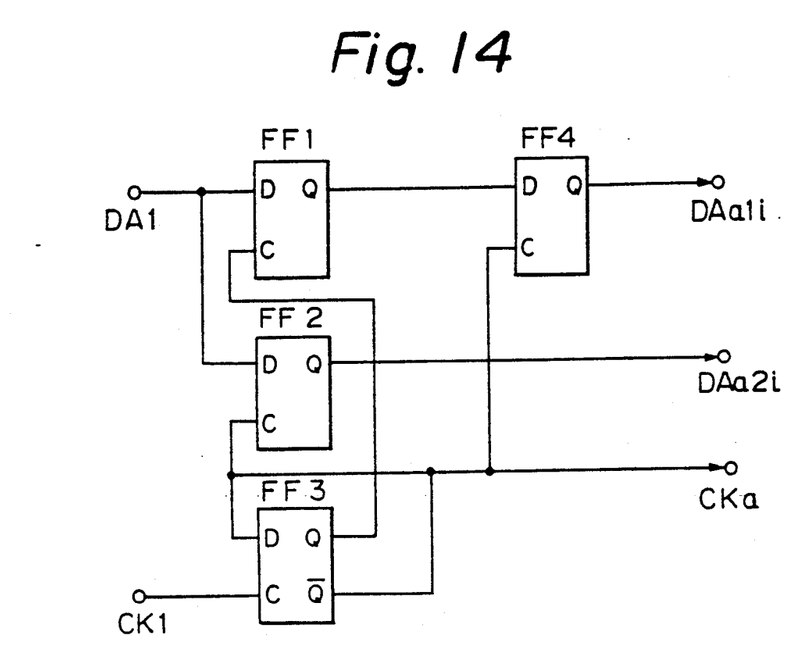
FIG. 14 is a circuit diagram showing a series to parallel conversion circuit of the embodiment shown in FIG. 7.

FIG. 14 is a circuit diagram showing an example of the series to parallel converter 10 in the embodiment shown in FIG. 7. In the figure, FF1 to FF4 are flip-flops, and the clock signal CK1 is supplied to the flip-flop FF3 at the clock terminal C thereof and demultiplied. The demultiplied clock signal is supplied to the flip-flops 21 to 24 and the OR circuit 29 as the clock signal CKa in FIG. 8.

The series data DA1 is supplied to the flip-flips FF1 to FF2 at the data terminals D's thereof, a clock terminal C of the flip-flop FF1 is supplied with an output signal of a Q terminal of the flip-flop FF3, a clock terminal C of the flip-flop FF2 is supplied with an output signal of a $\overline{Q}$ terminal of the flip-flop FF3, an output signal of a Q terminal of the flip-flop FF1 is supplied to a data terminal D of the flip-flop FF4, and a clock terminal C of the flip-flop FF4 is supplied with the clock signal CKa. As a result, the output signals from the Q terminals of the flip-flops FF4 and FF2 are the data DAa1 and DAa2, respectively, and this data is converted from the series data DA1 into two parallel data.

Figure 15:
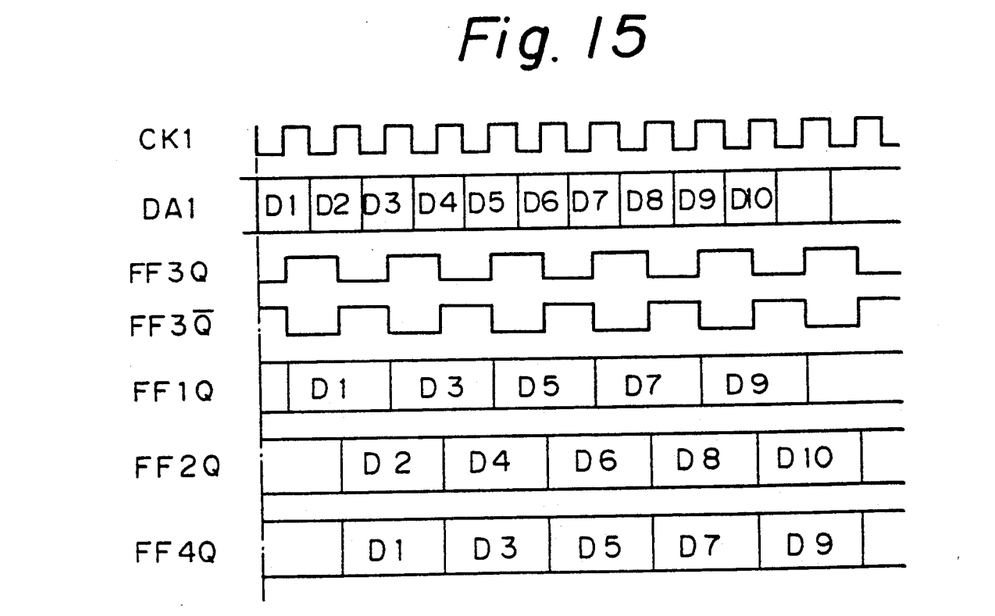
FIG. 15 is an explanatory diagram showing an operation of the circuit shown in FIG. 14.

FIG. 15 is an explanatory diagram of a conversion by the series to parallel converter, and explains the signals shown in FIG. 14. The waveform of the clock signal CK1 is shown at the first rank and synchronized with the series input data DA1. The series input data DA1 enters the converter in the order D1, D2, D3, . . . . The clock signal CK1 is demultiplied (i.e., divided to one-half the rate) by the flip-flop FF3, and the demultiplied signals are inverted in phase, as respectively shown by the waveforms FF3Q and FF3$\overline{Q}$. The signals FF3Q and FF3$\overline{Q}$ are supplied to the clock terminals C's of the flip-flops FF1 and FF2, respectively. The output signal from the Q terminal of the flip-flop FF1 is D1, D3, D5, . . . of the series input data DA1 as shown in FF1Q in FIG. 15, and the output signal from the Q terminal of the flip-flop FF2 is D2, D4, D6, . . . of the series input data DA1 as shown in FF2Q in FIG. 15. The output signal from the Q terminal of the flip-flop FF1 has a different phase from that of the output signal from the Q terminal of the flip-flop FF2, and therefore, using the flip-flop FF4, the phase of the output FF4Q is made to coincide with the phase of the output FF2Q. Namely, as shown by the data series FF4Q in FIG. 15, the output data from the Q terminal of the flip-flop FF4 is made to have the same phase as the output data from the flip-flop FF2.

As mentioned above, in this embodiment, after converting series data to parallel data, any desired pulses can be inserted in the parallel data.

It is obvious that many different embodiments of this invention may be created without departing from the spirit and scope thereof and thus it is understood that the invention is not limited to the specific embodiment thereof except as defined in the appended claims.

We claim:

1. A pulse insertion circuit for selectively inserting pulses into series input data to be processed for subsequent multiplexing and transmission at a predetermined data clocking rate, comprising:
   means for alternately distributing and thereby converting the series input data to parallel, first and second input data each at one-half the predetermined data clocking rate;
   a parallel type elastic memory having first and second input terminals and first and second output terminals;
   means for supplying to the memory a read clock signal at a rate which is one-half the predetermined data clocking rate;
   means for applying the parallel, first and second input data to the respective first and second input terminals of the memory and for selectively and synchronously writing same into and reading same from the memory and producing corresponding first and second input data, as read from the memory at the read clock rate, at the respective first and second memory output terminals;

means for receiving the second input data from the corresponding second output terminal of the memory and for delaying same by one bit and producing the one-bit delayed, second input data as an output therefrom;

selection means having first, second and third input terminals respectively receiving the first input data and the second input data, both as read from the memory, and the one-bit delayed second input data as output by the delay means and first and second output terminals, the selection means being selectively operable for selecting one of the second and third input terminals and for switching between and establishing, as to the first input terminal and the selected one of the second and third input terminals, straight connections thereof respectively to the first and second output terminals or cross-connections thereof respectively to the second and first output terminals and thereby producing corresponding, selected and parallel, first and second input data at the first and second output terminals thereof;

means for requesting the addition of a pulse to a specified one of the selected and parallel, first and second input data;

pulse addition means having first and second input terminals, respectively connected to the first and second output terminals of the selection means, and first and second output terminals, the pulse addition means being selectively operable for adding a pulse to the specified one of the selected and parallel, first and second input data received thereby and supplying the selected and parallel, first and second input data, including the pulse added to the specified one thereof, at the respective first and second output terminals thereof; and control means, responsive to receipt of a pulse insertion request from the requesting means, for inhibiting application of the read clock signal to the elastic memory for one memory read clock period and, during the inhibited memory read clock period, for controlling the selection means to select the delayed, second input data and to switch between and establish the alternate one of the straight and cross connections and for controlling the pulse addition means to add the pulse to the specified one of the selected and parallel, first and second input data received thereby.

2. A pulse insertion circuit as recited in claim 1, wherein the delay means comprises:

a D-type flip-flop having a D input terminal and an output terminal, respectively comprising the input and output terminals of the delay means, and a clock input terminal; and means for applying the memory read clock signal to the clock input terminal of the D-type flip-flop, the one-bit delayed, second input data being produced by the D-type flip-flop at the output terminal thereof.

3. A pulse insertion circuit as recited in claim 1, wherein:

the control means further comprises means for selectively supplying selection control signal values of "1" and "0" to the selection means; and the selection means is responsive to a selection control signal having a value of "1" for establishing the straight connection and a value of "0" for establishing a cross-connection.

4. A pulse insertion circuit as recited in claim 3, wherein the control means further comprises:

an exclusive OR circuit having first and second input terminals and an output terminal;

means for supplying a received pulse insertion request for the first of the parallel and selected, first and second input data to the first input terminal of the exclusive OR circuit;

means for delaying a received pulse insertion request for the second of the selected and parallel, first and second data output by one bit and for supplying the one bit delayed pulse insertion request to the second input of the exclusive OR circuit; and means for supplying the corresponding outputs produced by the exclusive OR circuit at the output terminal thereof to the selection means for controlling the selection and switching operations thereof.

5. A pulse insertion circuit as recited in claim 4, wherein the pulse addition requesting means supplies only a single request for a pulse addition to a specified one of the selected and parallel, first and second input data, during any individual memory read clock period.

6. A pulse insertion circuit as recited in claim 4, wherein the pulse addition requesting means requests the addition of successive pulses in alternate succession as to the selected and parallel, first and second input data.

7. A pulse insertion circuit as recited in claim 6, wherein the pulse addition requesting means initially requests the addition of a pulse to the first of the selected and parallel, first and second input data.

8. A pulse insertion circuit as recited in claim 6, wherein the pulse addition requesting means initially requests the addition of a pulse to the second of the selected and parallel, first and second input data.

* * * * *

UNITED STATES PATENT AND TRADEMARK OFFICE
CERTIFICATE OF CORRECTION

PATENT NO. : 5,014,271

DATED : May 7, 1991

INVENTOR(S) : FUJIMOTO et al.

It is certified that error appears in the above-identified patent and that said Letters Patent is hereby corrected as shown below:

```
Col. 2,  line 42, after "is" insert --read--.

Col. 4,  line 3, after "plural" insert --,--;
         line 4, after "spective" insert --,--;
 lines 50-51, after "the" (2nd occurrence) delete the rest of the sentence
             (up to, but not including the period) and insert --sixth
                 rank, by eliminating one pulse of the read clock signal
                 RCK--.

Col. 5,  line 36, change "DAa2" to --DAa2'--;
         line 38, change "DAa2" to --DAa2'--;
         line 40, change "DAa2," to --DAa2'--.

Col. 6,  line 55, change "," to --;--;
         line 56, change "DAa2;" to --DAa2',--;
 line 57, after "thereof" delete "," and insert --;-- and after "supplied"
                 insert --to--;
         line 65, after "to" delete ",";
         line 67, after "B" insert --,--.

Col. 7,  line 2, after "B" insert --,--;
         line 24, change "thereof'" to --thereof,--;
         line 44, change "." to --,--;
         line 45, after "parallel" delete ",";
         line 58, after "the" delete ",";
         line 59, change "initial" to --(initial)--;
         line 62, change "delay" to --"delay"--.
```

UNITED STATES PATENT AND TRADEMARK OFFICE
CERTIFICATE OF CORRECTION

PATENT NO. :   5,014,271

DATED      :   May 7, 1991

INVENTOR(S) :  FUJIMOTO et al.

It is certified that error appears in the above-identified patent and that said Letters Patent is hereby corrected as shown below:

```
Col. 8,  line 5, after "operation" delete ",";
         line 10, after "13" delete ",";
         line 25, after "becomes" delete ",";
line 35, after "data" (2nd occurrence) insert --as--;
         line 37, delete "and" (first occurrence).

Col. 10, line 20, change "DAl" to --DA1--;
         line 47, change "thereof'" to --thereof,--.
```

Signed and Sealed this

Thirteenth Day of July, 1993

Attest:

MICHAEL K. KIRK

*Attesting Officer*       Acting Commissioner of Patents and Trademarks